(12) United States Patent
Yablonski et al.

(10) Patent No.: US 10,872,417 B1
(45) Date of Patent: Dec. 22, 2020

(54) AUTOMATIC DELINEATION AGRICULTURAL FIELD MANAGEMENT ZONES USING REMOTE SENSING AND FIELD DATA

(71) Applicant: FlyPard Analytics GmbH, Cologne (DE)

(72) Inventors: Dzmitry Yablonski, Cologne (DE); Dmitry Dementiev, Cologne (DE); Vladimir Klinkov, Cologne (DE)

(73) Assignee: FlyPard Analytics GmbH, Cologne (DE)

( * ) Notice: Subject to any disclaimer, the term of this patent is extended or adjusted under 35 U.S.C. 154(b) by 63 days.

(21) Appl. No.: 16/503,543

(22) Filed: Jul. 4, 2019

(51) Int. Cl.
*G06T 7/11* (2017.01)
*G06T 5/50* (2006.01)

(52) U.S. Cl.
CPC .................. *G06T 7/11* (2017.01); *G06T 5/50* (2013.01); *G06T 2207/10032* (2013.01); *G06T 2207/20221* (2013.01); *G06T 2207/30188* (2013.01)

(58) Field of Classification Search
CPC ... G06T 7/11; G06T 5/50; G06T 2207/10032; G06T 2207/20221; G06T 2207/30188; G06T 11/00; A01B 79/005; A01B 49/06; G06Q 50/02; G06K 9/00657; G06K 9/0063; A01C 21/007
See application file for complete search history.

(56) References Cited

U.S. PATENT DOCUMENTS

| | | | |
|---|---|---|---|
| 2015/0206255 A1* | 7/2015 | Groeneveld | A01C 21/00 111/200 |
| 2018/0132423 A1* | 5/2018 | Rowan | G06F 30/20 |
| 2018/0146624 A1* | 5/2018 | Chen | A01B 79/005 |
| 2019/0075727 A1* | 3/2019 | Duke | G06K 9/00657 |

OTHER PUBLICATIONS

Georgi et al, Automatic delineation algorithm for site-specific management zones based on satellite remote sensing data, Nov. 2017, Precision Agriculture 19, 684-707.*

* cited by examiner

*Primary Examiner* — Matthew C Bella
*Assistant Examiner* — Kathleen M Broughton
(74) *Attorney, Agent, or Firm* — Bardmesser Law Group

(57) ABSTRACT

A method for automatic delineation of agricultural field management zones using remote sensing data from multiple years of observation and field data, including: selecting and processing remote sensing images appropriate for management zones delineation; defining management zones analytics parameters; generating a dataset by calculating vegetation indices for every appropriate remote sensing image, by removing outliers and values of non-arable spots, by considering different resolutions of remote sensing images, by applying statistical interpolation algorithms; generating field management zones by applying statistical classification methods on the dataset including merging small and separate management zones into larger neighboring zones. A computer system is programmed and configured to generate field management zones automatically; to enable user to assign rates for every management zone, and to export them to (Continued)

agricultural machinery and to mobile phone or tablet device for online and offline usage.

14 Claims, 9 Drawing Sheets

AUTOMATIC DELINEATION AGRICULTURAL FIELD MANAGEMENT ZONES USING REMOTE SENSING AND FIELD DATA

BACKGROUND OF THE INVENTION

Field of the Invention

The present invention relates to systems and methods for processing of multi-year remote sensing images of agricultural fields in precision agriculture domain to automatically generate management zones.

Description of the Related Art

An agricultural field is not homogeneous, since it contains spots with various yield productivity levels. These spots are called field management zones in precision agriculture. On some fields, the difference between the most productive and the least productive spots reaches a factor of 10. This is the basis of an intra-field variability crop management concept called precision agriculture. Accurate recognition and classification of such variable spots are the only way to make precision agricultural-based technologies work effectively.

Every agricultural field is unique and there are no two completely identical fields in the world. That means every field has to be analyzed separately to recognize its crop development behavior pattern. Remote sensing technology provides perfect input datasets, which include different open-source and proprietary satellite image providers, aircraft image providers and drone image providers. Basically, remote sensing data sources are divided to meter resolution satellite images (example: Planet Skysat mission with 1 m resolution, NASA Landsat mission with 30 m resolution, ESA Sentinel mission with 10 m resolution) and centimeter resolution aerial images made from drones and aircraft.

Having multi-year datasets from various providers helps to detect and geolocate all crucial spots on the field. There is a possibility to delineate field management zones with high accuracy using statistical algorithms and mathematical methods, together with remote sensing datasets, as a major input data source. Thereby, generic field management zones are created. Unfortunately, delineation of field management zones is a very complex task, which involves a lot of complicated computational steps, and their execution is often impossible for a human being.

There is the complexity of computations to delineate field management zones accurately for the precision agricultural industry to see significant changes with increasing food production, decreasing chemicals usage and facilitating environment recovery. Delineation of field management zones has many hidden problems within it: different resolutions, historical years coverage and physical characteristics of sensors from different remote sensing image data sources that make it impossible to compare them between each other without additional statistical and geospatial manipulations, different geospatial projections even for the same location, artificial or natural objects located on the field or close to the field's boundary influences on the final field management zones result. Strip farming of different field's parts mixes up the final result as well.

Every crop-variety combination is unique: biomass saturation differs in time for a combination, crop development varies during the season and depends on weather and soil conditions, and every crop-variety consumes specific amounts of various nutrients.

A conventional system for delineating field management zones based on historical yield maps is described in US Patent Publication No. 20180046735 A1, which covers a process of field management zones delineation based on historical yield data.

Another conventional system for identifying field management zones in agricultural fields and generating planting plans for the zones is described in US Patent No. US20180132422A1, which covers field management zones delineation for planting plans based on field yield data and field characteristics.

Research paper "Automatic delineation algorithm for site-specific management zones based on satellite remote sensing data" describes automatic delineation algorithm for site-specific field management zones based on satellite images from a single provider (RapidEye images from 2009 till 2015), normalized difference vegetation index and quantile classification.

Another conventional method for managing farmland is described in US Patent Publication No. 6549852 B2, which covers dividing the plot of land into agronomy zones having attributable characteristics related to the elevation, soil conductivity, crop yield, and grower history information and their utilization.

Another conventional system for generating agricultural information products using remote sensing is described in US Patent Publication No. 20110135196 A1, which covers generating the plurality of primary index raster files including at least two independent vegetation index (VI) raster files and a soil brightness index (SBI) raster file.

Another conventional system for mapping GIS layers is described in US Patent Publication No. 8412419 B1, which covers methods and apparatus for classifying agricultural attribute data used in geographical information systems (GIS).

Another conventional system and method for prescribing fertilizer application rates for the spatial distribution of a product are described in US Patent Publication No. 20190059203 A1, which covers estimation of fertilizer application rates and providing a prescription for spatial distribution of the selected product over a given field(s) based on historical and forecast weather data, remote sensing satellite imagery including the normalized difference vegetation index (NDVI) assessment for 1-to-many satellite images of the given field(s), soil mineralization model.

Another conventional method for prescribing site-specific fertilizer application in agricultural fields is described in U.S. Pat. No. 7,343,867 B2, which regulates the amount of fertilizer that is applied to agricultural fields while still maintaining the maximum possible crop yield, where created prescription is based on vegetation remote sensing image, bare soil remote sensing image, average yield data, historical field crop type data, soil measure data, topographic data, and irrigation data.

However, there are limitations that result in inaccuracy in the delineation of field management zones. Using only a single remote sensing image shows crop development at a specific moment of time, and it does not reflect existing historical stable field behavior. On the other hand, using as many as possible years of remote sensing images provides more chances to define more relevant field variability behavior pattern. In addition, it is important to have enough remote sensing images during crop development season to select appropriate images for zones delineation. In many cases to achieve these requirements, remote sensing images from different providers, often with different resolutions, need to be used.

Using remote sensing image datasets without preprocessing reduces the field management zones accuracy. The preprocessing includes atmospheric correction, clouds and cloud shadows recognition, artificial in-field objects detection. Also, using projected Universal Transverse Mercator (UTM) coordinate system gives as accurate as possible geolocation of in-field objects.

Using historical yield maps is a good approach, but such maps are produced only by special harvested machinery which has to be calibrated correctly before the operation and the data has to be cleaned up from extremal values. Regardless, private yield data is not always available for public access for every field for every year.

Artificial objects (roads close to or on the field, oil wells, etc.), other objects not treated as arable land (in-field single trees, seasonal wetlands, etc.) have to be removed from remote sensing image datasets, and datasets with clouds and cloud shadows covering the field have to be excluded from the analysis as well.

As noted above, there is no one silver bullet to resolve all the corner cases.

SUMMARY OF THE INVENTION

The present invention is directed to a system and method for automatic delineation of agricultural field management zones based on multi-year remote sensing image datasets (images with different resolution, different years, providers and sensors) including the influence of in-field data, that substantially obviates the disadvantages of the related art.

"Automatically" means the system is able to accurately delineate field management zones for every field across the world without manual user involvement. The proposed approach includes: selecting and processing remote sensing images appropriate for management zones delineation; defining management zones analytics parameters; generating a dataset by calculating vegetation indices for every appropriate remote sensing image, by removing outliers and values of non-arable spots, by considering different resolutions of remote sensing images, and by applying statistical interpolation algorithms; generating field management zones by applying statistical classification methods on the dataset including merging small and separate management zones into larger neighboring zones. Therefore, delineation of field management zones is built on top of available remote sensing datasets and in-field data. In addition, the system assists with user input to set rates of fertilizers, seeds, crop protection products to prepare application maps and exports them to machine-readable files for further usage in agricultural machinery and provides technical opportunities for online/offline use as well.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE ATTACHED FIGURES

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
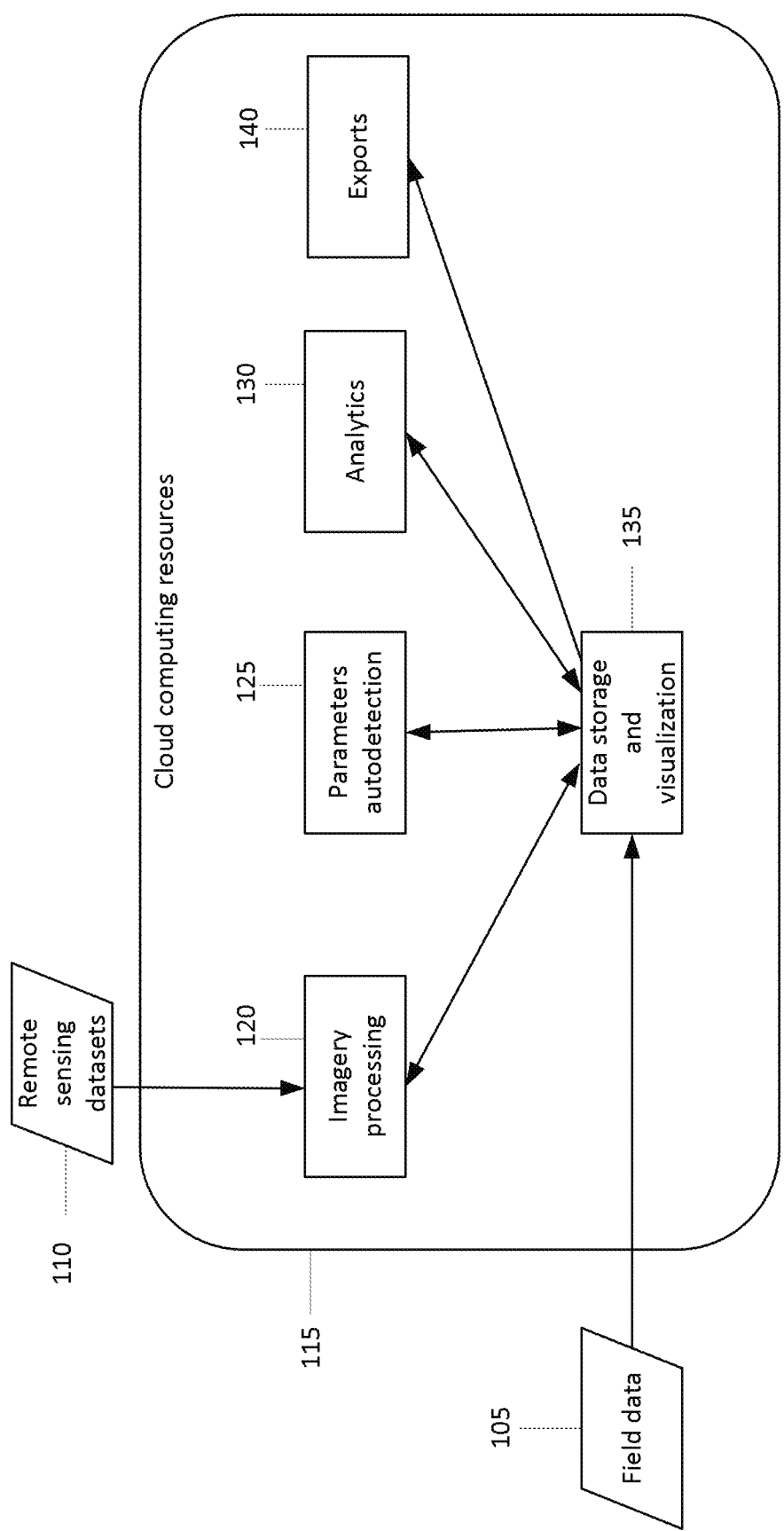
FIG. 1 illustrates high-level modules of the system with a logical split based on types of supported operations.

FIG. 1 illustrates high-level modules of the system with a logical division based on types of supported operations. As shown in FIG. 1, the system is developed based on the capabilities of cloud computing resources 115, which are a placeholder of any cloud computing platform with cloud-based web services, storages, queues, servers, security and so on. Field data 105 and remote sensing datasets 110 are used as inputs.

Field data input 105 includes directly field-related data such as boundary and the metadata about history of seeded crops and about related agricultural operations. Remote sensing datasets input 110 includes but not limited to open-sourced (ex: NASA Landsat mission, ESA Sentinel mission) and proprietary (such as Planet Skysat mission, Planet RapidEye, AirBus Pleiades) images from remote sensing providers together with meta-information (ex: acquisition date, geo coordinates) of those images. The system also includes the following modules: imagery processing 120, parameters autodetection 125, analytics 130, data storage 135 and export 140. The detailed descriptions of these modules from functional perspective are described with reference to FIG. 2, FIG. 3, FIG. 4, FIG. 5, FIG. 6 below.

Figure 2:
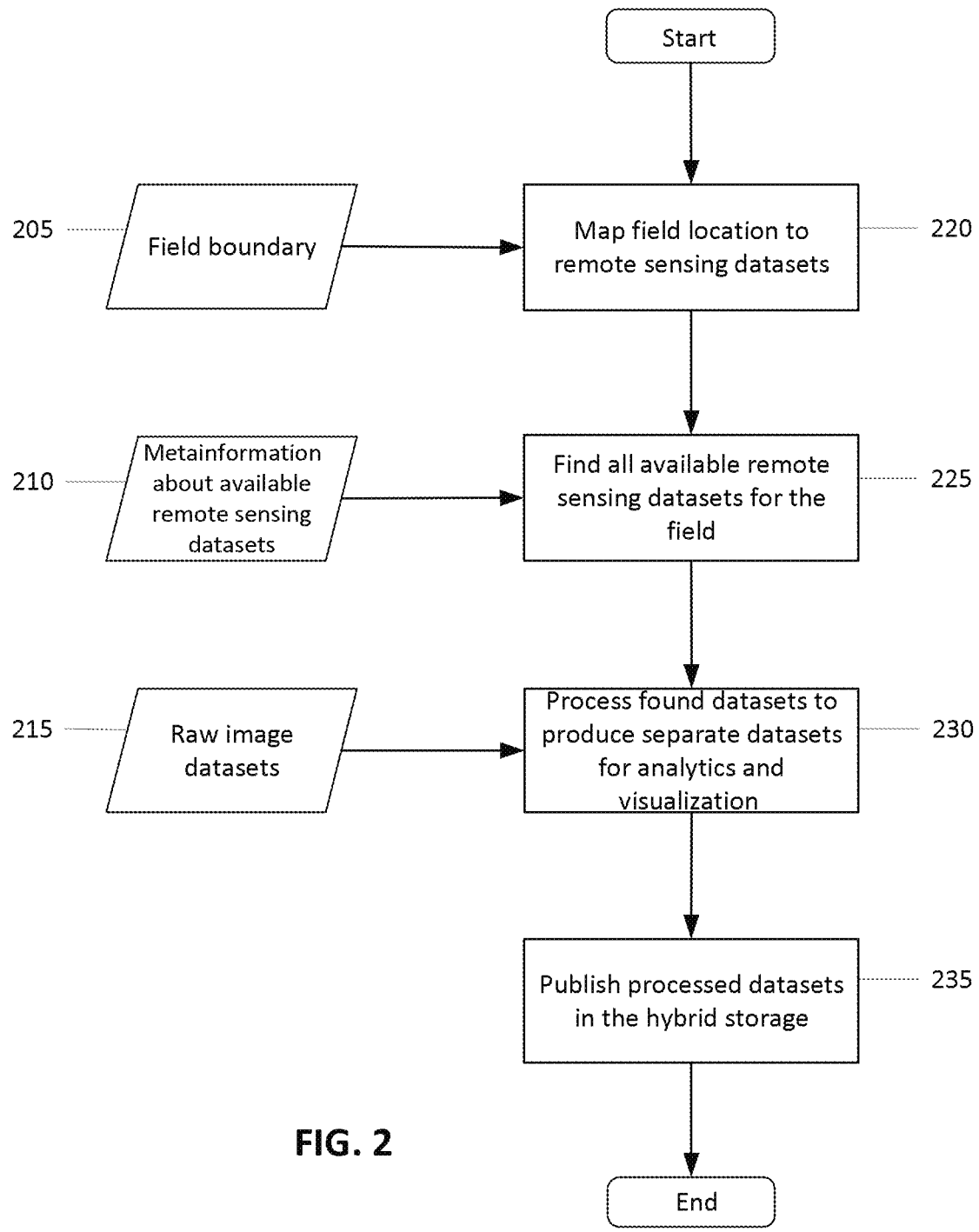
FIG. 2 illustrates steps performed by the remote sensing image processing module.

FIG. 2 illustrates steps performed by the remote sensing dataset processing module 120 with basic steps description and necessary input parameters. As shown in FIG. 2, the imagery processing module 120 performs number of steps required to prepare analytics-ready datasets 305 for the field boundary: mapping of field location to remote sensing datasets (step 220), finding of all available remote sensing datasets for the field (step 225), processing of the found datasets to produce separate datasets for analytics and visualization (step 230) and publishing of processed datasets in the data storage (step 235). Remote sensing datasets are processed in their projected Universal Transverse Mercator (UTM) coordinate system to be able to calculate management zones without area distortions that can arise when applying datasets re-projection to the geographic World Geodetic System 1984 Web Mercator coordinate system before calculating vegetation index in every pixel.

Input parameter field boundary 205 is a part of field data (input 105) and used to map field location to remote sensing datasets (step 220), which includes remote sensing datasets covering the field boundary. Knowing that, together with metadata representing descriptive information about available remote sensing datasets such as acquisition date, resolution, solar zenith angle, estimated clouds percentage, etc. (input 210), it is possible to define all available datasets for the field (step 225).

A remote sensing image must fully overlap the field boundary to become an input source of field analysis or visualization. After that, there is processing of lithe found datasets (step 230). It downloads a raw image dataset 215 from a remote sensing provider, works them out to apply atmospheric correction to the raw dataset and to recognize clouds and cloud shadows in the corrected raw dataset. Separate datasets suitable for analytics and visualization are produced based on the corrected raw dataset. An analytics dataset saves the original correlation between the bands values and is always in projected Universal Transverse Mercator (UTM) coordinate system and is generated using lossless compression (examples of lossless compression include DEFLATE, LZW, etc.). A visualization-ready dataset is generated by adding overviews, compression using image statistics and is in the geographic World Geodetic System 1984 Web Mercator coordinate system. The next step is to publish processed datasets in the data storage (step 235).

Figure 3:
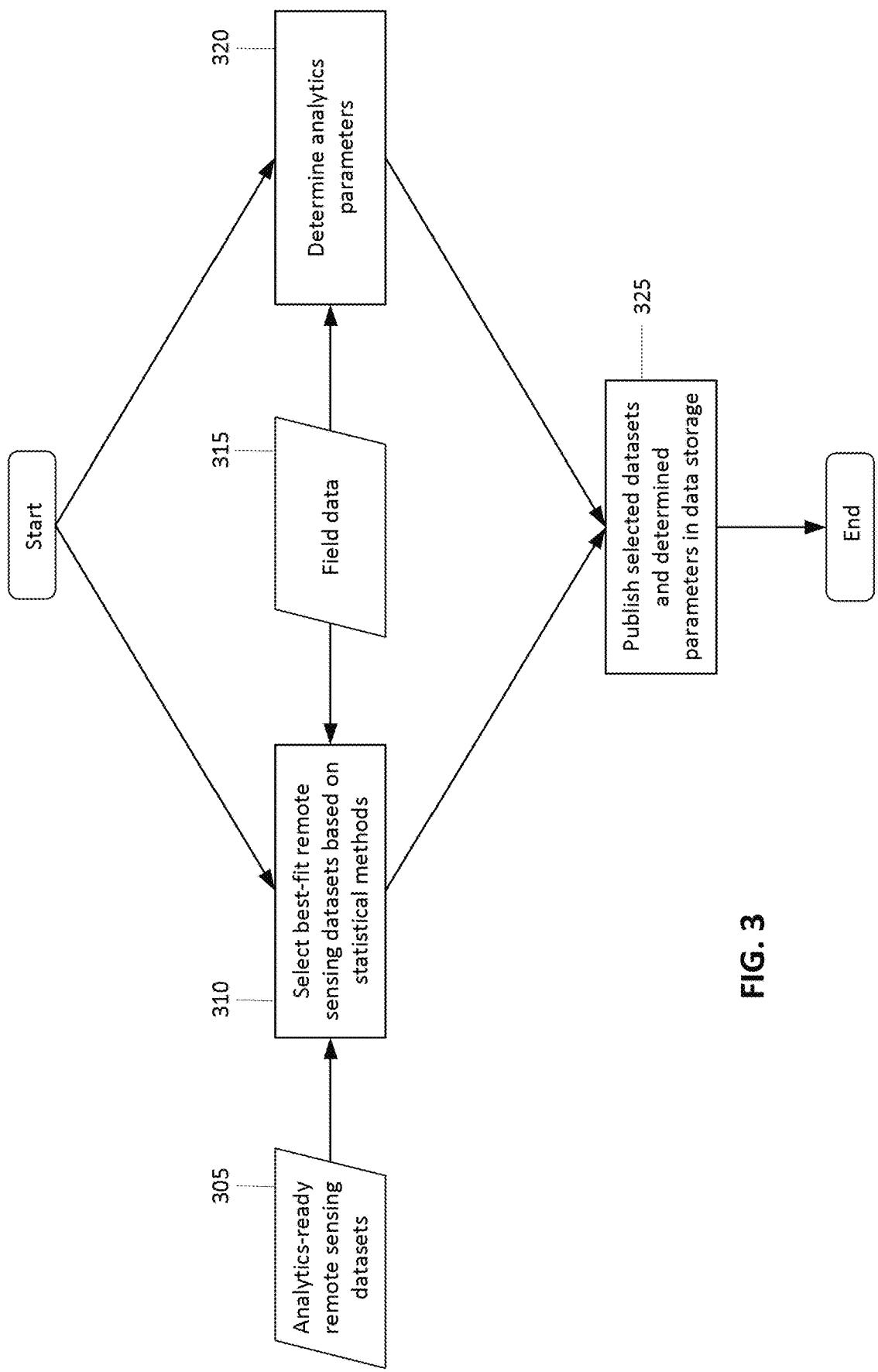
FIG. 3 illustrates steps performed by the parameter auto-detection module.

FIG. 3 illustrates the steps of parameter autodetection component workflow with basic step description and necessary input parameters. As shown in FIG. 3, the parameters autodetection module 125 includes logical steps to perform the following: select best-fit remote sensing datasets based on statistical methods (step 310), determine analytics parameters (step 320), publish the selected datasets and determined parameters (step 325) and input data as analytics-ready remote sensing datasets 305, field data 315. The major input data is analytics-ready remote sensing datasets 305, which are available right after image processing module 120 execution, but the data is generic and covers much more area compared to field area size. Therefore, boundary cropping and statistical filtering based on field data 305 are necessary.

Selecting best-fit remote sensing datasets based on statistical methods (step 310) includes autodetection of artificial in-field objects and other in-field objects not considered as arable land, passing the threshold for average vegetation index configured per crop per region, passing the vegetation grow period per crop per region including buffer applied to the field boundary. The buffer is used to reduce size of the pixel extraction field area in selected remote sensing images by omitting pixels corresponding edges of the agricultural field area, and taking into account resolution of the remote sensing dataset. In step 310, statistical methods calculate mean, standard deviation, and range for every remote sensing image dataset and field combination, purges extreme values according to three sigma limits (outliers) and selects an image for every year within the period of a peak vegetation. The peak vegetation is determined by the maximum value of vegetation index for the agricultural field area taking into account vegetation index saturation restriction.

In parallel with selecting, determining analytics parameters (step 320) is executed to process field data (input 315) and to determine field specific parameters for further use in analytic engine (module 130). The parameters include field management zones output resolution, a number of field management zones, vegetation index to use. The parameters are autodetected for every crop, if known. Bigger field area and greater in-field vegetation variability between most productive and least productive spots lead to a greater number of zones. Higher remote sensing image resolution value leads to a higher field management zones resolution value. And the final functional step is saving of the selected datasets and determined parameters to the data storage (step 325). It saves the datasets from best-fit remote sensing datasets based on statistical methods (step 310) and from determine analytics parameters (step 320).

Figure 4:
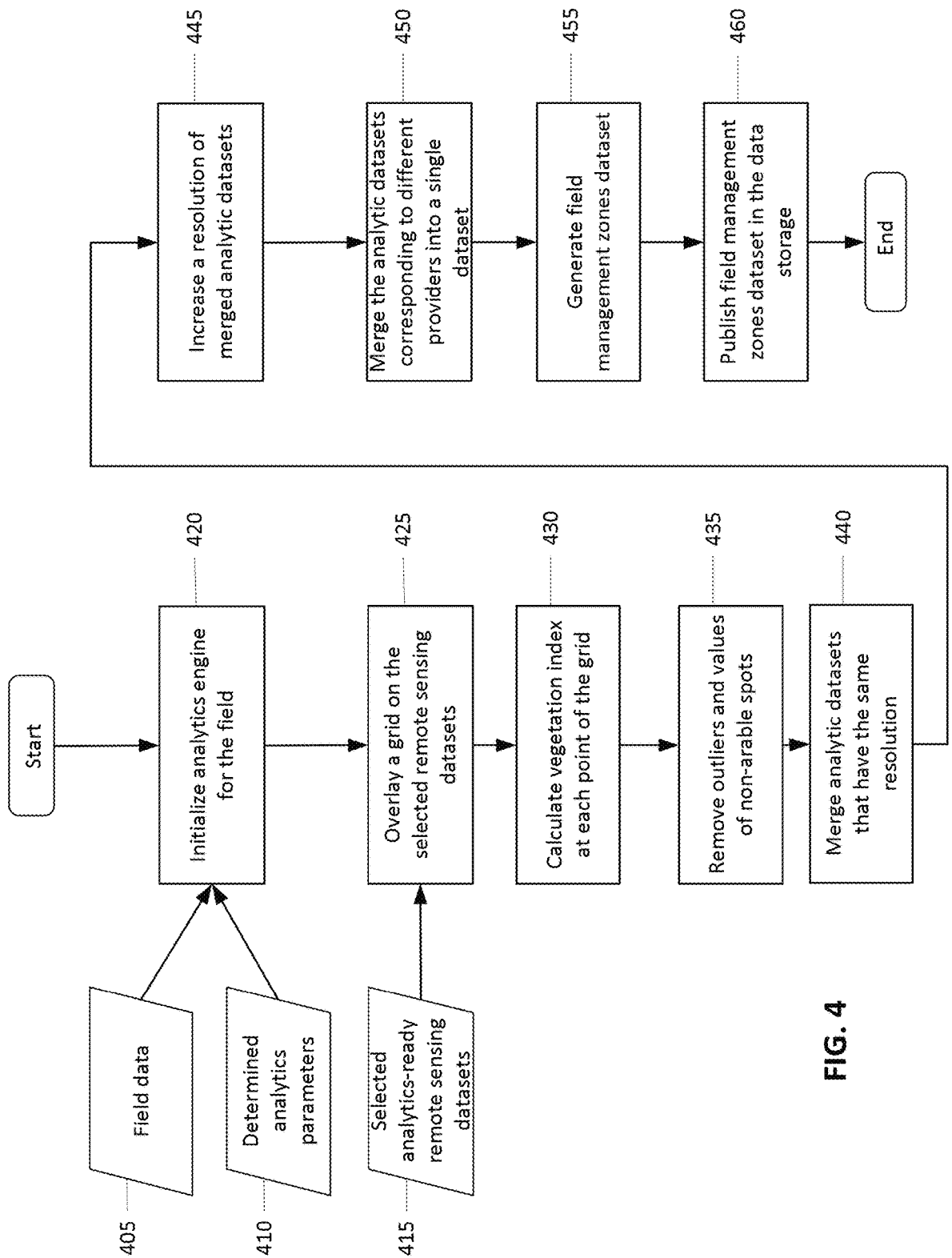
FIG. 4 illustrates steps performed by the analytics module.

FIG. 4 illustrates the analytics module 130 with basic steps description and necessary input parameters. As shown in FIG. 4, the analytics module 130 uses a large number of statistical and mathematical methods, and implements the following steps: initializing analytics engine for the field (step 420), overlaying a grid (number of points with coordinates located at the same distance from each other, where distance equals to dataset resolution) on the selected remote sensing datasets (step 425), calculating vegetation index at each point of the grid (step 430), removing outliers and values of non-arable spots (step 435) to generate an analytic dataset for each selected dataset, merging analytic datasets of images that have the same resolution (step 440), increasing a resolution of the merged analytic datasets including filling of any gaps in a surface of the field management zones (step 445), merging analytic datasets corresponding to different providers into a single dataset (step 450), generating field management zones dataset (step 455) and publishing/storing the field management zones dataset in the data storage (step 460).

The parameters, such as field data (input 405), analytics parameters (input 410), and analytics-ready remote sensing datasets (input 415), come from the parameters autodetection module 125. In initialize of the analytics engine for the field (step 420), field data (input 405) and analytics parameters (input 410) are collected from the data storage (module 135) and input object is prepared. In overlaying a grid on the selected remote sensing datasets (step 425), selected analytics-ready remote sensing datasets (input 415) are collected from the data storage (module 135) and converted into matrices containing grid based pixel values including a buffer applied to the field boundary (the buffer number is defined based on remote sensing image resolution). This multi-dimensional matrix containing values of pixels is calculated for every selected analytic-ready remote sensing dataset.

In calculating vegetation index at each point of the grid (step 430), calculations based on vegetation indices formulas are performed. In removing outliers and values of non-arable spots (step 435) to generate an analytic dataset for each selected dataset, calculations based on statistical cleaning data methods are performed. In merging analytic datasets of images that have the same resolution (step 440), analytic datasets are merged according to same selected analytic-ready remote sensing datasets resolution. In increasing a resolution of the merged analytic datasets including filing of cover any gaps in a surface of the field management zones (step 445), mathematical interpolation methods are employed to fill missed or corrupted values, to increase image resolution and to build a continuous surface. In merging analytic datasets corresponding to different providers into a single dataset (step 450), sources from different remote sensing providers are aggregated into a single dataset based on weighted arithmetic mean operation. In generating a field management zones dataset (step 455), statistical classification methods are used to split pixels of single dataset into groups based on pixels values, single dataset of continuous surface is converted to polygons and separated ones from them are merged into larger polygons and as result field management zones dataset is represented by number of multipolygons. And then, cropping of the field management zones dataset based on the original field boundary is applied as well. (A polygon is a planar surface defined by 1 exterior boundary and 0 or more interior boundaries. A multipolygon is a multi-surface whose elements are polygons.) In the step of publishing field management zones dataset in the data storage (step 460), all calculated datasets are saved into the data storage (module 135).

Figure 5:
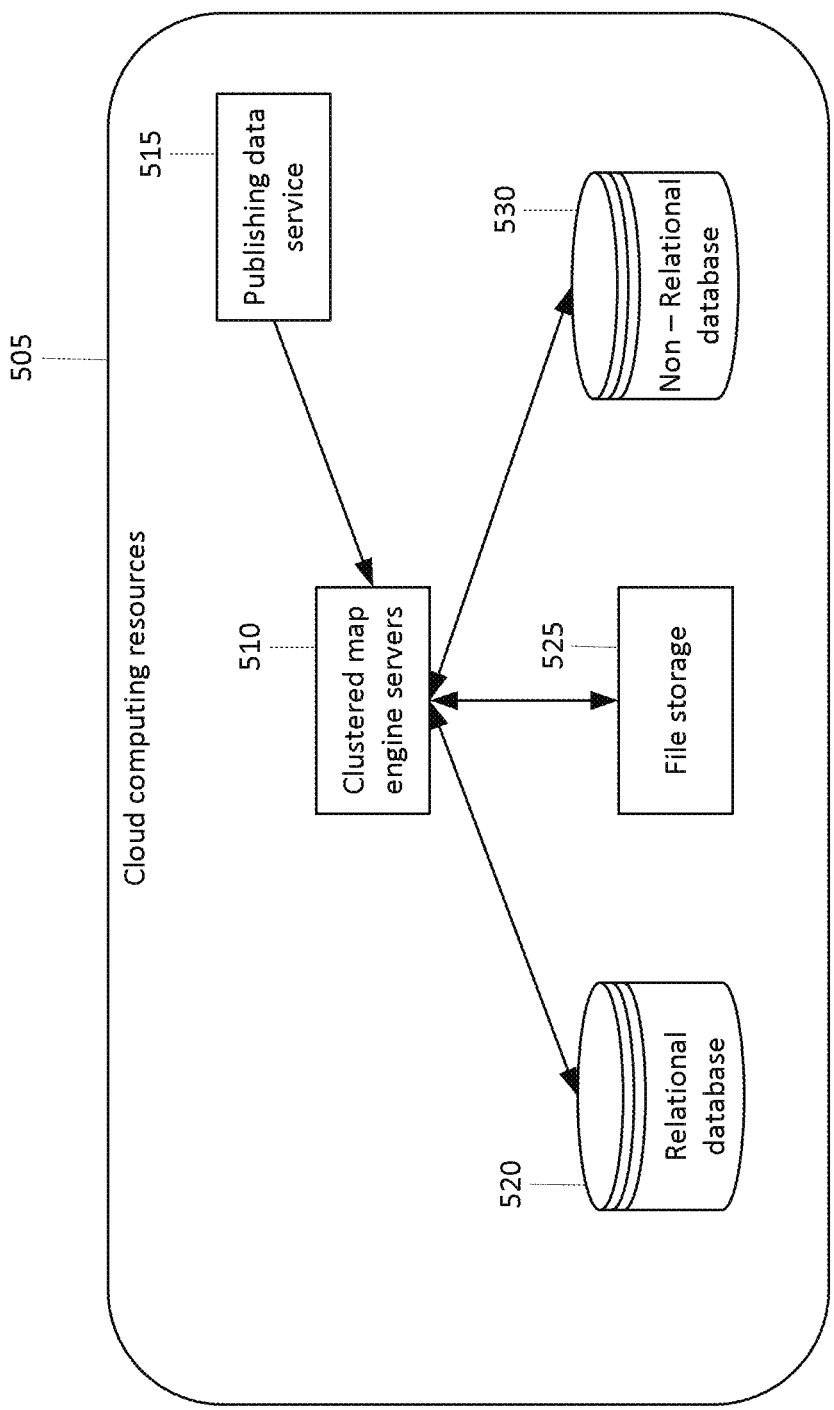
FIG. 5 illustrates components of the data storage module which is located in cloud computing resources, that operate as the storage and visualization engine for georeferenced data.

FIG. 5 illustrates components of the data storage, which is located in cloud computing resources, and is operated as storage and visualization engine for georeferenced data and all its derivatives and meta-information. As shown in FIG. 5, the data storage (module 135) is based on cloud computing resources 505, which represents a cloud computing platform (see discussion of FIG. 1 above). The data storage (module 135) includes the following components: a publishing data service 515, clustered map engine servers 510, a relational database 520, a file storage 525, and a non-relational database 530. Delivery of georeferenced datasets to the storage is triggered by the publishing data service (component 515) and occurs via clustered map engine servers (component 510). The clustered map engine servers (component 510) share, process, store, visualize geospatial data, such as data from ArcGIS and/or GeoServer.

The publishing data service (component 515) receives new georeferenced datasets, splits them to georeferenced vector dataset based on point locations, georeferenced raster dataset based on matrix of pixels, descriptions of vector and raster datasets and publishes them to the clustered map engine servers (component 510), to the relational database (component 520), to the file storage (component 525), and to the non-relational database (component 530).

The relational database (component 520) is a data store based on a relational data structure and uses a structured query language. The used advantage is a pre-installed extension to support operations with geospatial data objects such as points, polygons, lines. The relational database (component 520) stores field management zones geometries with attributes, global information about locations of remote sensing datasets, which are represented as geographic objects.

The file storage (component 525) stores various file types, in the system case, the files are georeferenced raster datasets. It stores remote sensing images of visualization and analysis datasets, field management zones raster images.

The non-relational database (component 530) is a data store that does not follow the relational model provided by traditional relational database management. The used advantage is flexibility and performance to operate with big data volumes. The non-relational database (component 530) contains meta-information about fields (ex: owner information, farm and field name, area, history of crops and operations, binding to remote sensing images, etc.), list of available remote sensing datasets and providers, field management zones description. Clustered map engine servers (component 510) access the relational database (component 520), the file storage (component 525), the non-relational database (component 530) and operate with geospatial data.

Figure 6:
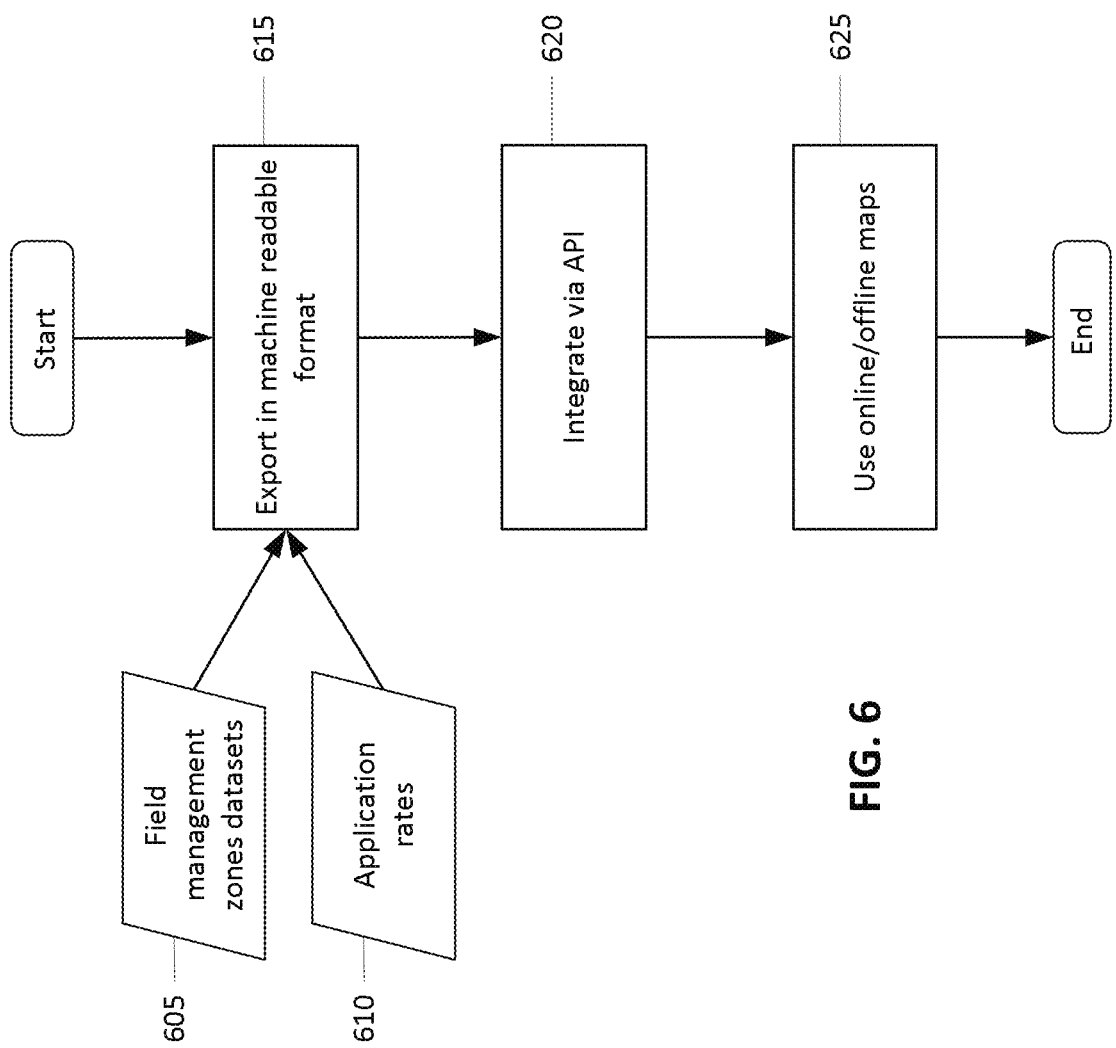
FIG. 6 illustrates steps performed by the field management zones export module.

FIG. 6 illustrates field management zones export module 145, with a detailed description of every step. As shown in FIG. 6, the export (module 145) contains the following steps: export in machine-readable format (step 615), integrate via API (step 620), use online/offline maps (step 625). Diving deeper, export in the machine-readable format (step 615) reads field management zones datasets (input 605) and together with user's application rates (inputs 610) generates shapefile and isoxml based outputs for further usage in machinery including wireless file transfer. From another side, integration via API (step 620) is possible and generates output in API communication supported formats. For user convenience, maps can be used in online and offline modes within the use online/offline maps (step 625).

Figure 7:
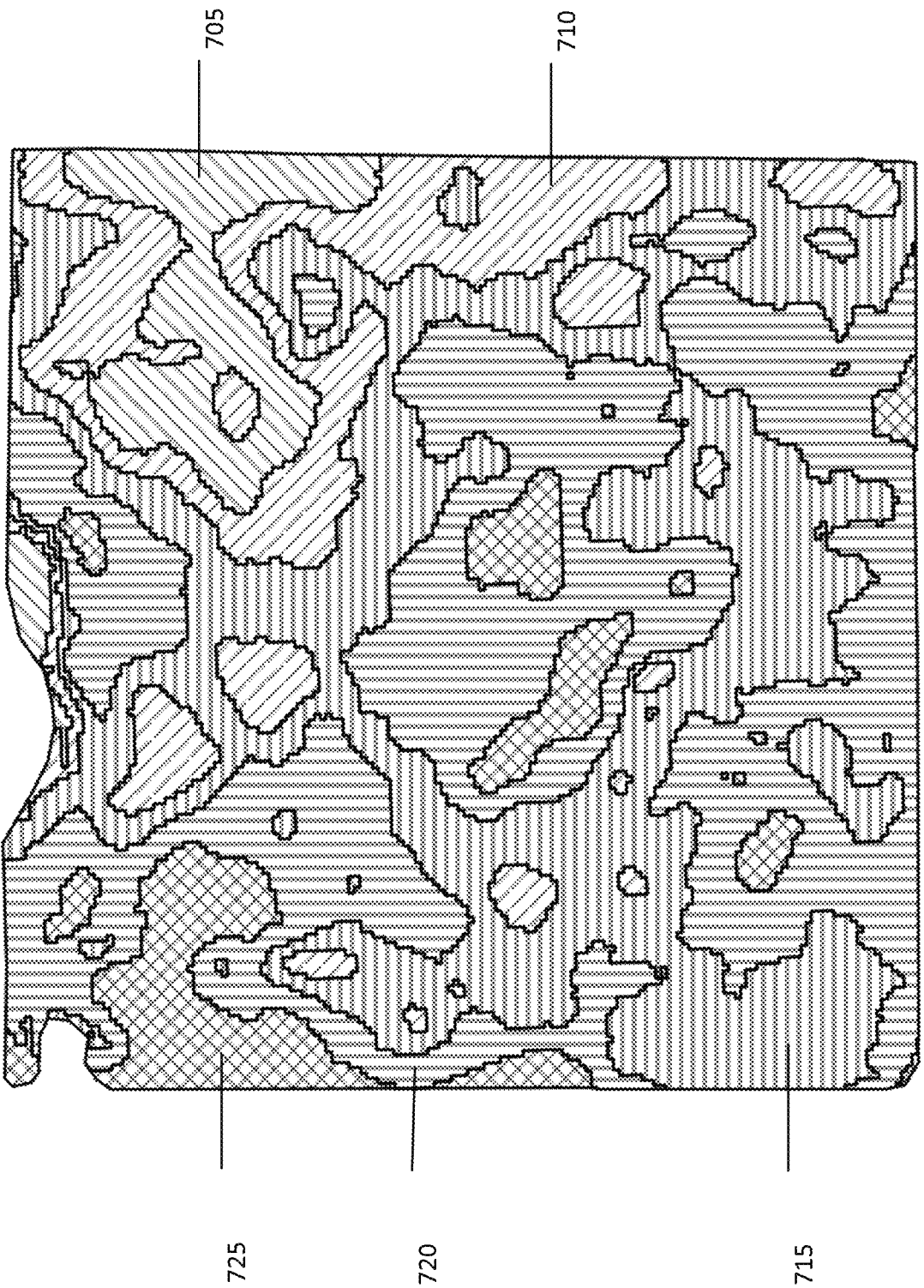
FIG. 7 illustrates the field management zones generic sample based on the vegetation index.

FIG. 7 illustrates field management zones generic sample based on 30 years remote sensing images history from Landsat and Sentinel missions. As shown in FIG. 7, an example of field management zones contains field boundary split into 5 zones 705, 710, 715, 720, 725. Every field management zone represents spots with similar field productivity. The lower value of vegetation index represents low productivity zones 705, 710 and relates to some issues with the mentioned field spots. The higher value of vegetation index represents high productivity zones 715, 720, 725 and relates to the best performing field spots.

Figure 8:
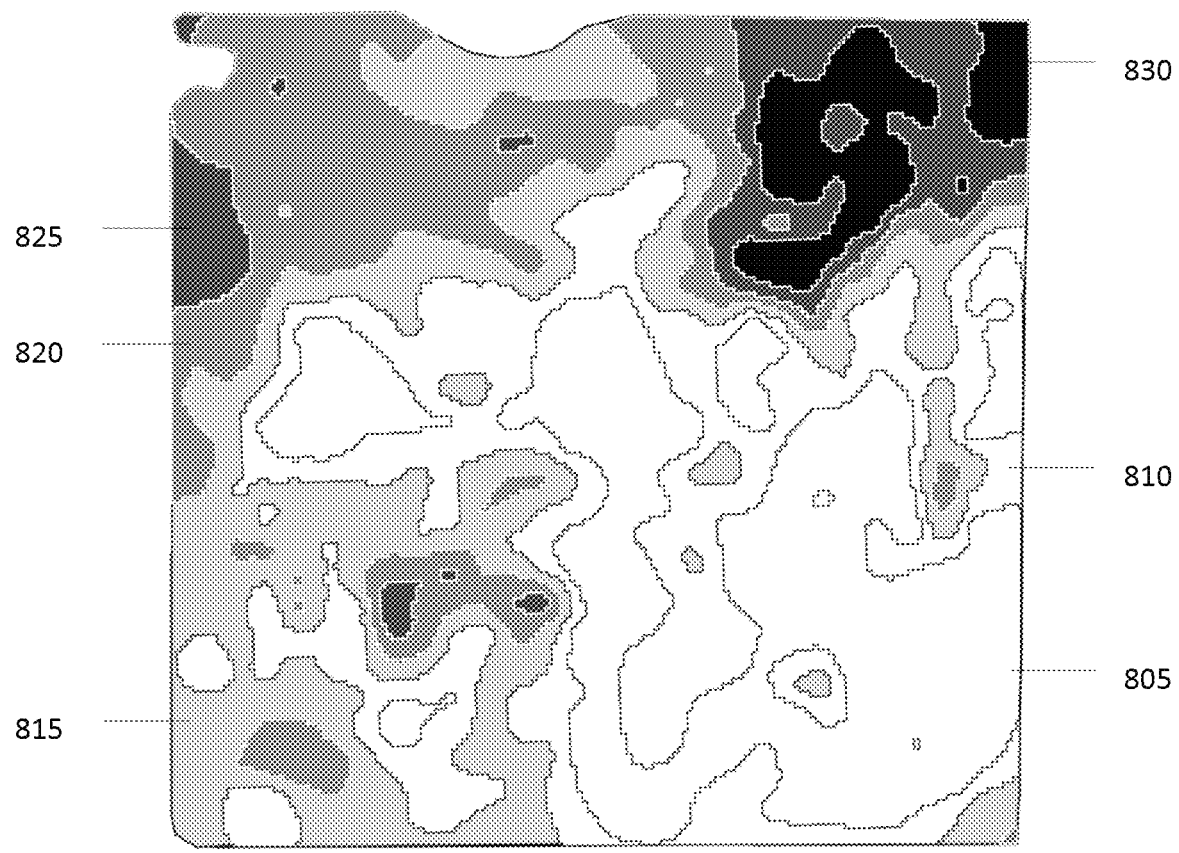
FIG. 8 illustrates field management zones generic sample based on the coefficient of variation.

FIG. 8 illustrates field management zones generic sample based on the coefficient of variation using 30 years remote sensing images history from Landsat and Sentinel missions. As shown in FIG. 8, an example of field management zones contains field boundary split into 6 zones 805, 810, 815, 820, 825, 830. Every field management zone represents spots with a similar coefficient of variation (CV). The lower value of CV represents less changeable pattern within the history in zones 805, 810 in comparison with zones 815, 820, 825, 830 that have higher CV values and represent higher variability within the history.

Figure 9:
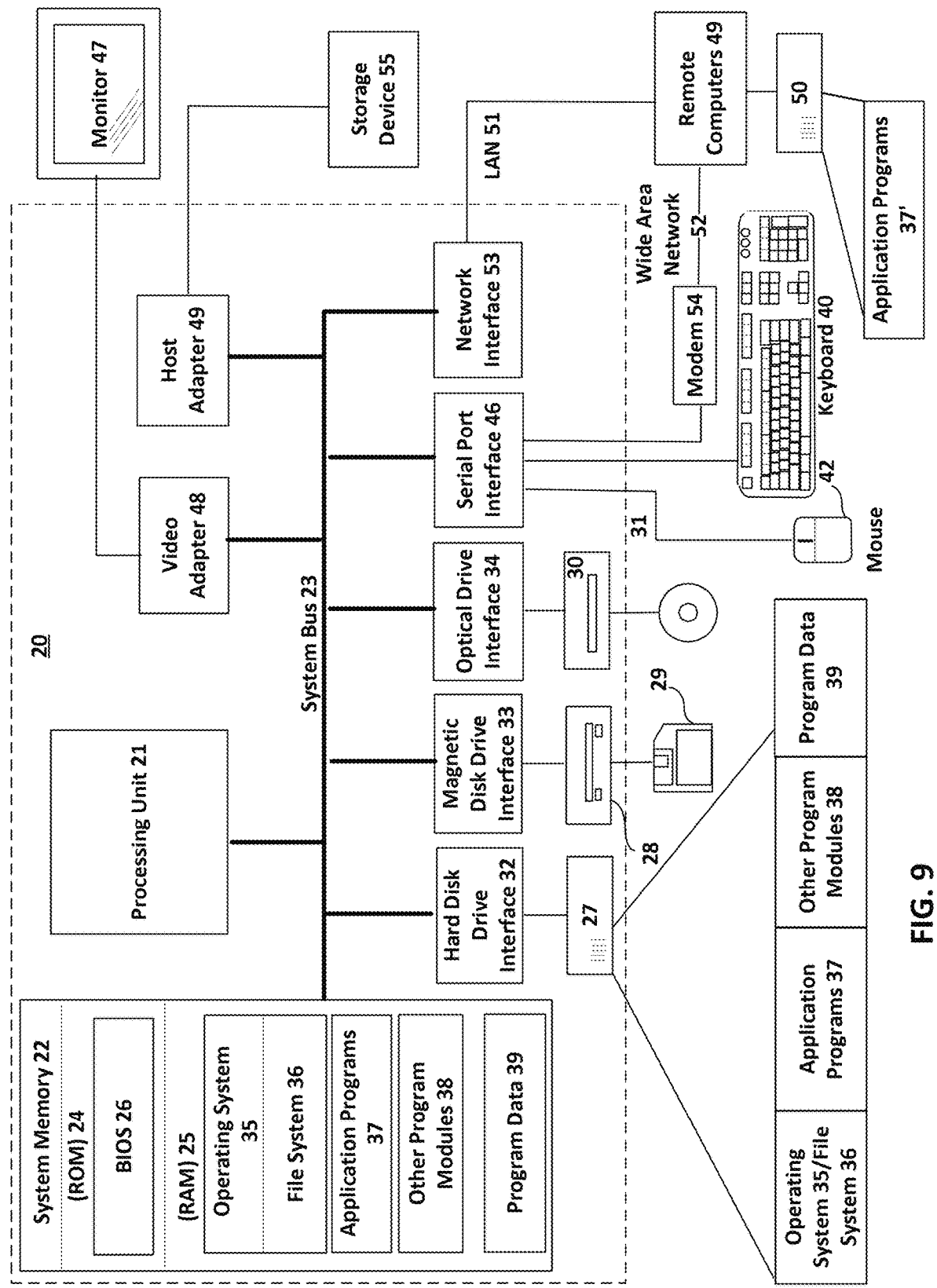
FIG. 9 shows an exemplary computer system for implementing the invention.

With reference to FIG. 9, an exemplary system for implementing the invention includes a general purpose computing device in the form of a host computer or a server 20 or the like, including a processing unit (CPU) 21, a system memory 22, and a system bus 23 that couples various system components including the system memory to the processing unit 21.

The system bus 23 may be any of several types of bus structures including a memory bus or memory controller, a peripheral bus, and a local bus using any of a variety of bus architectures. The system memory includes a read-only memory (ROM) 24 and random access memory (RAM) 25. A basic input/output system 26 (BIOS), containing the basic routines that help to transfer information between the elements within the computer 20, such as during start-up, is stored in ROM 24.

The computer or server 20 may further include a hard disk drive 27 for reading from and writing to a hard disk, not shown herein, a magnetic disk drive 28 for reading from or writing to a removable magnetic disk 29, and an optical disk drive 30 for reading from or writing to a removable optical disk 31 such as a CD-ROM, DVD-ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively.

The drives and their associated computer-readable media provide non-volatile storage of computer readable instructions, data structures, program modules and other data for the server 20. Although the exemplary environment described herein employs a hard disk (storage device 55), a removable magnetic disk 29 and a removable optical disk 31, it should be appreciated by those skilled in the art that other types of computer readable media that can store data that is accessible by a computer, such as magnetic cassettes, flash memory cards, digital video disks, Bernoulli cartridges, random access memories (RAMs), read-only memories (ROMs) and the like may also be used in the exemplary operating environment.

A number of program modules may be stored on the hard disk (storage device 55), magnetic disk 29, optical disk 31, ROM 24 or RAM 25, including an operating system 35 (e.g., MICROSOFT WINDOWS, LINUX, APPLE OS X or similar). The server/computer 20 includes a file system 36 associated with or included within the operating system 35, such as the Windows NT™ File System (NTFS) or similar, one or more application programs 37, other program modules 38 and program data 39. A user may enter commands and information into the server 20 through input devices such as a keyboard 40 and pointing device 42.

Other input devices (not shown) may include a microphone, joystick, game pad, satellite dish, scanner or the like. These and other input devices are often connected to the processing unit 21 through a serial port interface 46 that is coupled to the system bus, and they may also be connected by other interfaces, such as a parallel port, game port or universal serial bus (USB). A monitor 47 or other type of display device is also connected to the system bus 23 via an interface, such as a video adapter 48. In addition to the monitor 47, computers typically include other peripheral output devices (not shown), such as speakers and printers. A host adapter 49 is used to connect to the storage device 55.

The server/computer 20 may operate in a networked environment using logical connections to one or more remote computers 49. The remote computer (or computers) 49 may be another personal computer, a server, a router, a network PC, a peer device or other common network node, and it typically includes some or all of the elements described above relative to the server 20, although here only a memory storage device 50 with application software 37' is illustrated. The logical connections include a local area network (LAN) 51 and a wide area network (WAN) 52. Such networking environments are common in offices, enterprise-wide computer networks, Intranets and the Internet.

In a LAN environment, the server/computer 20 is connected to the local network 51 through a network interface or adapter 53. When used in a WAN networking environment, the server 20 typically includes a modem 54 or other means for establishing communications over the wide area network 52, such as the Internet.

The modem 54, which may be internal or external, is connected to the system bus 23 via the serial port interface 46. In a networked environment, the program modules depicted relative to the computer or server 20, or portions thereof, may be stored in the remote memory storage device. It will be appreciated that the network connections shown are merely exemplary and other means of establishing a communications link between the computers may be used.

Having thus described a preferred embodiment, it should be apparent to those skilled in the art that certain advantages of the described method and apparatus have been achieved.

It should also be appreciated that various modifications, adaptations and alternative embodiments thereof may be made within the scope and spirit of the present invention. The invention is further defined by the following claims.

What is claimed is:

1. A method for automatic delineation of agricultural field management zones, comprising the steps of:
    selecting the remote sensing images that satisfy the following criteria (i) no clouds or cloud shadows are present, (ii) autodetection of artificial in-field objects that can be processed out of the images, (iii) average vegetation index per crop per region is in a specified range, and (iv) images were taken during a peak vegetation period for a particular crop in that region;
    calculating an optimal number of zones in the agricultural field based on a size of the agricultural field area and in-field vegetation variability between most productive and least productive spots;
    calculating an optimal resolution pixel size of an output map of the field management zones based on resolution of the selected remote sensing images;
    reducing size of pixel extraction field area in selected remote sensing images by omitting pixels corresponding edges of the agricultural field area, and taking into account the resolution of the images; and
    generating the field management zones, by
        (i) overlaying a grid on the selected remote sensing images;
        (ii) calculating vegetation index at each point of the grid;
        (iii) at each point of the grid, removing outliers and values of non-arable spots to generate an analytic dataset for each selected image;
        (iv) merging analytic datasets of images that have the same resolution;
        (v) increasing a resolution of the merged analytic datasets including filling of any gaps in a surface of the field management zones;
        (vi) merging analytic datasets corresponding to different providers into a single dataset; and
        (vii) generating the output map of the field management zones by splitting pixels of the single dataset into groups based on their values, and merging separated polygons into larger polygons, and then cropping the field management zones based on original field boundaries.

2. The method of claim 1, further comprising:
    before selecting the remote sensing images, processing the remote sensing images by performing one or more of: (i) downloading a raw images dataset from a remote sensing provider, (ii) applying atmospheric correction to the raw dataset, (iii) recognizing clouds and cloud shadows in the corrected raw dataset, (iv) applying the lossless data compression algorithm to the corrected raw dataset, and (v) keeping resolution and original cross-band values correlation in projected Universal Transverse Mercator (UTM) coordinate system.

3. The method of claim 1, wherein step (v) takes into account statistical interpolation algorithms for increasing resolution and building a continuous surface on top of vegetation index grid values for the agricultural field area.

4. The method of claim 1, wherein step (vi) merges analytics datasets from different remote sensing image providers into a single dataset based on a weighted arithmetic mean and using the projected field coordinate system.

5. The method of claim 1, wherein step (vii) takes into account statistical classification methods and converts the single dataset from a continuous pixel-based raster dataset to a class-based vector dataset in a form of multipolygons.

6. The method of claim 1, wherein step (vii) takes into account area distortions due to a projected coordinate system of the agricultural field area onto the output map.

7. A data processing system comprising:
    one or more servers configured to perform the following steps:
        selecting the remote sensing images that satisfy the following criteria (i) no clouds or cloud shadows are present, (ii) autodetection of artificial in-field objects that can be processed out of the images, (iii) average vegetation index per crop per region is in a specified range, and (iv) images were taken during a peak vegetation period for a particular crop in that region;

calculating an optimal number of zones in the agricultural field based on a size of the agricultural field area and in-field vegetation variability between most productive and least productive spots;

calculating an optimal resolution pixel size of an output map of the field management zones based on resolution of the selected remote sensing images;

reducing size of the pixel extraction field area in remote sensing images by omitting pixels corresponding edges of the agricultural field area, and taking into account the resolution of the images; and generating the field management zones, by
(i) overlaying a grid on the selected remote sensing images;
(ii) calculating vegetation index at each point of the grid;
(iii) at each point of the grid, removing outliers and values of non-arable spots to generate an analytic dataset for each selected image;
(iv) merging analytic datasets of images that have the same resolution;
(v) increasing a resolution of the merged analytic datasets, including filling of any gaps in a surface of the field management zones;
(vi) merging analytic datasets corresponding to different providers into a single dataset; and
(vii) generating the output map of the field management zones by splitting pixels of the single dataset into groups based on their values, and merging separated polygons into larger polygons, and then cropping the field management zones based on original field boundaries.

8. The system of claim 7, wherein the server(s) are further configured to perform:

storing the georeferenced data of the remote datasets, field boundaries, field management zones and their metadata;

before selecting the remote sensing images, processing the remote sensing images by performing one or more of: (i) downloading a raw images dataset from a remote sensing provider, (ii) applying atmospheric correction to the raw dataset, (iii) recognizing clouds and cloud shadows in the corrected raw dataset, (iv) applying the lossless data compression algorithm to the corrected raw dataset, and (v) keeping resolution and original cross-band values correlation in projected Universal Transverse Mercator (UTM) coordinate system.

9. The system of claim 7, wherein (v) takes into account statistical interpolation algorithms for increasing resolution and building a continuous surface on top of vegetation index grid values for the agricultural field area.

10. The system of claim 7, wherein (vi) merges analytics datasets from different remote sensing image providers into a single dataset based on a weighted arithmetic mean operation and using the projected field coordinate system.

11. The system of claim 7, wherein (vii) takes into account statistical classification methods and converts the single dataset from a continuous pixel-based raster dataset to a class-based vector dataset in a form of multipolygons.

12. The system of claim 7, further comprising generating a coefficient of variation map on top of the field management zones based on a ratio of a standard deviation to a mean of the vegetation index, wherein the standard deviation and the mean are calculated from in-field vegetation index values generated from the remote sensing images.

13. The system of claim 7, wherein (vii) takes into account area distortions due to a projected coordinate system of the agricultural field area onto the output map.

14. The system of claim 7, further comprising outputting a visualization of the field management zones to access pre-downloaded data via mobile or desktop interfaces in offline mode.

* * * * *